(12) United States Patent
Bondu

(10) Patent No.: US 7,594,433 B2
(45) Date of Patent: Sep. 29, 2009

(54) METHOD OF PROCESSING DATA IN A VEHICLE TIRE MONITORING SYSTEM

(75) Inventor: Lucien Bondu, La-Roche-Noire (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 454 days.

(21) Appl. No.: 11/649,565

(22) Filed: Jan. 4, 2007

(65) Prior Publication Data
US 2007/0191996 A1 Aug. 16, 2007

(30) Foreign Application Priority Data
Jan. 5, 2006 (FR) .................................. 06 00142

(51) Int. Cl.
*B60C 23/02* (2006.01)
(52) U.S. Cl. ...................... 73/146.5; 73/146.2; 73/146
(58) Field of Classification Search ........ 73/146–146.8; 340/442–447
See application file for complete search history.

(56) References Cited

U.S. PATENT DOCUMENTS

| 4,703,650 | A | 11/1987 | Dosjoub et al. |
| 4,893,110 | A | 1/1990 | Hebert |
| 5,712,616 | A * | 1/1998 | Schmitt et al. ............... 340/442 |
| 5,780,733 | A | 7/1998 | Meunier et al. |
| 5,825,286 | A | 10/1998 | Coulthard et al. |
| 5,826,207 | A * | 10/1998 | Ohashi et al. .................. 701/36 |
| 7,119,670 | B2 * | 10/2006 | Hammerschmidt ......... 340/447 |
| 2003/0074961 | A1 | 4/2003 | Fischer et al. |
| 2004/0196149 | A1* | 10/2004 | Dufournier .................. 340/443 |
| 2005/0044945 | A1 | 3/2005 | Hammerschmidt |

FOREIGN PATENT DOCUMENTS

EP 0 786 361 A1 1/1997

\* cited by examiner

*Primary Examiner*—Andre J Allen
*Assistant Examiner*—Jermaine Jenkins
(74) *Attorney, Agent, or Firm*—Cohen Pontani Lieberman & Pavane LLP

(57) ABSTRACT

Method of processing data in a vehicle tire monitoring system. For a first given period of time, referred to as the reference period, a device calculates, for each class of temperature supplied, the corresponding mean pressure in a given tire. Then, for at least a second given period of time, the device calculates, for each class of temperature supplied, the corresponding mean pressure and the difference between this mean pressure and the reference mean pressure, and the device calculates the mean value of these differences.

18 Claims, 3 Drawing Sheets

METHOD OF PROCESSING DATA IN A VEHICLE TIRE MONITORING SYSTEM

FIELD OF THE INVENTION

The present invention relates to tire monitoring systems. More particularly it concerns the use of measurements made on the tires with a view to giving one or more alarms.

BACKGROUND OF THE INVENTION

Very many devices, such as the one in the U.S. Pat. No. 4,703,650, have been proposed for transmitting, to a central unit, in a regular fashion, inflation pressure measurements for each tire accompanied, where applicable, by measurements of the temperature of the internal air of the tires.

However, knowledge of the inflation pressures does not suffice to give the driver reliable and useful information. There is a risk that continuous consultation of this information may be more tedious than actually useful. This because tire pressure and/or temperature measurements vary enormously in running because of the heating of the tires due to its hysteresis losses, the influence of the heat given off by the brakes and load transfers that cause slight variations in the volume of the tires.

This is why, in the patent U.S. Pat. No. 4,893,110, a method was proposed for using measurements based on comparisons between two or more two tires that aims to be able to give an alarm in the event of failure of a tire without adopting alert thresholds excessively departing from the precision achieved by the measuring devices.

This treatment, despite its advantage, has not completely resolved the problem. This is because the improvement in the precision of detection in the case of failure of a tire requires the initial pressures of the tires to be strictly identical. In reality such is not at all the case and it is entirely usually and normal to observe differences in inflation pressure when cold of around 10% or even 15%. This is moreover the range accepted by the European Tire and Rim Technical Organisation (ETRTO) for heavy vehicles, for example. These differences are due in particular to the precision of inflation pressure gauges of around 5%, to imprecision during inflation of around 3%, to the consequences of exposure of the tires to sunshine, etc. The method described in the application cited cannot therefore have better detection precision than the usual initial differences if it is not wished to cause many false alarms. Consequently detection of failure of one of the tires can be achieved only after a very appreciable reduction in the inflation pressure of the tire, which requires immediate repair action.

The application EP 0786361A proposes a method of detecting a slow leak in one of the tires of a vehicle in which the variation over time in the pressure differences between two adjacent tires is monitored and an alarm is triggered when this variation exceeds a given threshold.

This method effectively make it possible to detect a slow leak in a tire very early but proves ineffective when a leak affects the two tires being monitored in a similar fashion. It may therefore be useful to supplement it with a method based on the use of measurements made upon a single tire.

SUMMARY OF THE INVENTION

An object of the invention is to use measurement signals from a tire monitoring system that detects any failure of one of the tires early on and during running.

This and other objects are attained in accordance with one aspect of the present invention directed to a a method of processing the data from a vehicle tire monitoring system, the system regularly supplying for at least one tire values of the pressure and temperature of the fluid in the internal cavity of the tire, in which, for a given tire:

for a first given period of time, referred to as the reference period:
- a device divides up, by class of temperature $[T]_i$, all the tire pressure and temperature values supplied during the reference period; and
- for each class of temperature $[T]_i$, the device calculates the mean pressure $(\overline{p_{i,r}})$ of the corresponding pressure values:

for at least a second given period of time, referred to as period j:
- the device divides up by class of temperature $[T]_i$ all the tire pressure and temperature values supplied during the period of time j;
- for each class of temperature, the device calculates the mean pressure $(\overline{p_{i,j}})$ of the corresponding pressure values;
- for each class of temperature, the device calculates the difference between the mean pressure and the reference mean pressure $(\Delta p_{i,j} = \overline{p_{i,j}} - \overline{p_{i,r}})$; and
- the device calculates the mean value of the differences between the mean pressures and the mean reference pressures $\overline{\Delta p_j}$.

This method makes it possible to be free of the scatter in the data transmitted by the tire monitoring system by producing two successive means.

Advantageously, the device triggers an alarm when the means of the differences satisfy a given relationship.

In the case where a given temperature class $[T]_i$ is empty for the reference period whilst this class $[T]_i$ is not empty for the periods j & k to the period k, subsequent to the period j, preferably, the device:
- calculates the mean pressure $(\overline{p_{i,k}})$ of the pressure values of the class $[T]_i$ and of the period k;
- calculates the difference between this mean pressure and the mean pressure of the class $[T]_i$ of the period j $(\Delta p_{i,k} = \overline{p_{i,k}} - \overline{p_{i,j}})$;
- corrects the mean pressure difference of the temperature class $[T]_i$ by adding the mean value of the differences between the mean pressures and the reference mean pressures $\overline{\Delta p_j}$ obtained for the period j, that is to say $\Delta p_{i,k}{}^c = \overline{p_{i,k}} - \overline{p_{i,j}} + \overline{\Delta p_j}$; and
- the device calculates the mean value of the said differences and corrected differences between the said mean pressures and the said reference mean pressures $\overline{\Delta p_k}$.

These steps make it possible to apply the method of the invention for all operating temperatures that have not appeared during the first so-called reference period.

Advantageously, the device calculates the mean value of the pressure differences $\overline{\Delta p_j}$ for n successive periods of time, taking the oldest period of time as the reference period, and triggers an alarm when the change over time of the mean values of these pressure differences satisfies a given relationship.

By way of example, the device can trigger an alarm when the variation over time of the mean values of these pressure difference exceeds, in absolute value, a given threshold S.

This threshold S can be between 3% and 10% of the nominal value of the inflation pressure of the tire in question.

According to a preferential embodiment, the device calculates several series of mean pressure difference values for periods of time of different durations in order to cover all the usual deflation ranges of vehicle tires. These periods can have durations of between one hour and several days.

Preferably, in order to improve the precision of detection, the method according to invention can take into account only the temperature and pressure values supplied for a given period of time between the maximum temperature supplied and a given lower temperature. This lower temperature may be equal to the maximum temperature reduced by 20° C.

Likewise, the method according to the invention can, for each period of time, effect a statistical analysis of the temperature and pressure data supplied and take the period of time in question into account only if the scatter of the measurements is below a given threshold.

The statistical analysis can simply be a linear regression and the period of time may not be taken into account when the regression coefficient of the data in question is below 0.7.

When the vehicle in question is a construction vehicle, the period of time chosen comprises one day.

Another aspect of the invention is directed to a device for implementing the above-mentioned method, comprising:
  at least one access to the data to be processed;
  at least one calculation unit, permitting classifications and calculations; and
  instructions for use, enabling the method to be executed.

This device is preferentially able to cooperate with a means of presenting the results.

Another aspect of the invention is directed to a computer system comprising the above device.

Another aspect of the invention is directed to software comprising code elements programmed for implementing the method according to the invention, when the software is loaded into a computer system and executed by the computer system.

Another aspect of the invention is directed to software in the form of a product recorded on a medium that can be read by a computer system, comprising code elements programmed according to the method of the invention.

DETAILED DESCRIPTION OF THE DRAWINGS

Figure 1:
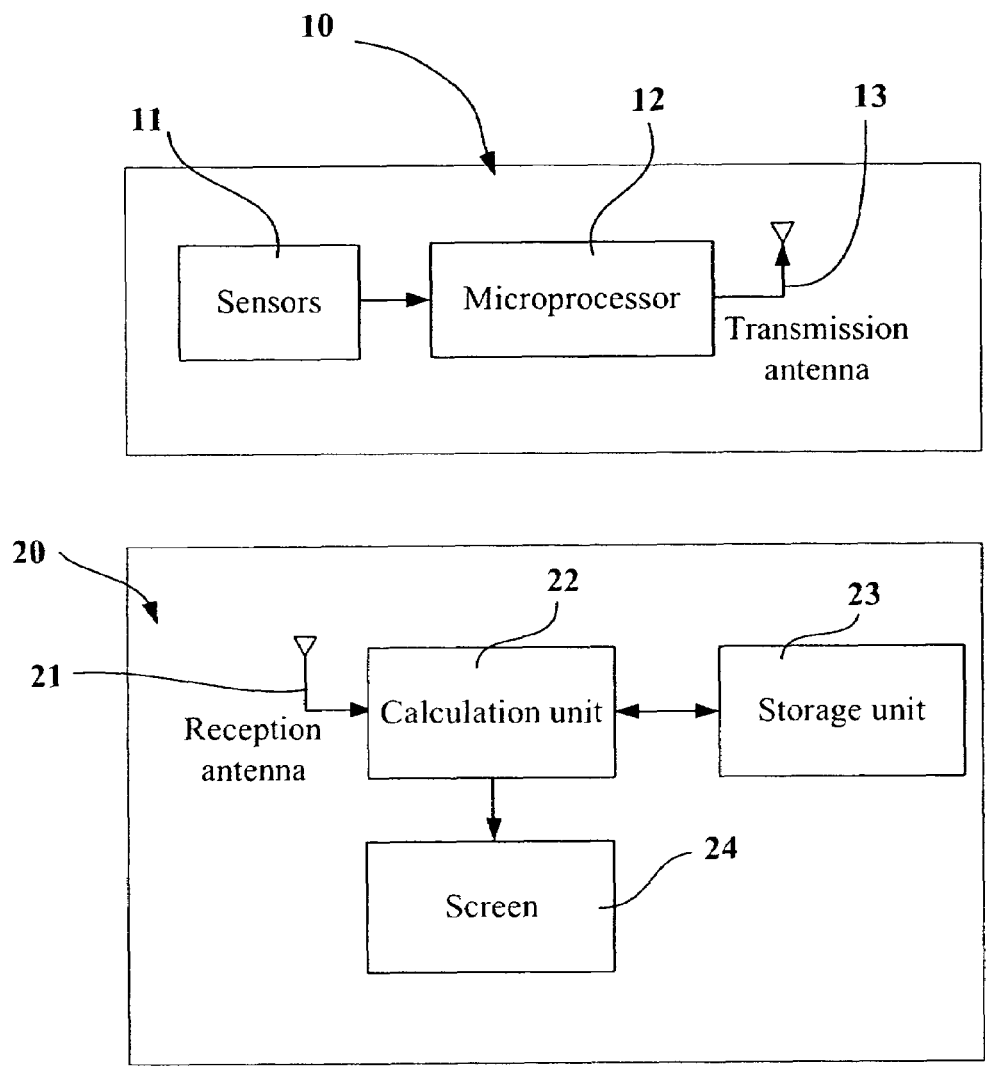
FIG. 1 presents a simplified diagram of a system for monitoring the tires of a vehicle with a device for implementing a method embodiment of the invention.

FIG. 1 presents a simplified diagram of a system for monitoring the tires of a vehicle with a device for implementing a method embodiment of the invention. This monitoring system comprises, in its most simple form, an electronic module 10 and a device 20 for processing and presenting the data. The electronic module is disposed in the internal cavity of each of the tires of the vehicle concerned. By way of an example, in the case of a construction vehicle, this electronic module can be fixed to the internal surface of the tire by means of a rubber patch. The device 20 can be disposed in the chassis of the vehicle. This device can also be external to the vehicle.

Each electronic module 10 comprises principally sensors 11 for measuring in the internal cavity of the tire at least the pressure and temperature of the internal fluid, a microprocessor 12 for managing the measurements and preprocessing them, and an antenna 13 for transmitting the data measured. This electronic module can also comprise suitable power supply means not shown.

The device 20 for processing and presenting the data comprises principally a reception antenna 21 for receiving, for example by radio, the data transmitted by each electronic module 10, a calculation unit 22 for processing the data, a storage unit 23 and a unit for presenting the results, for example a screen 24. The device 20 also comprises software comprising code elements programmed for implementing the method according to the invention loaded in the calculation unit 22.

Figure 2:
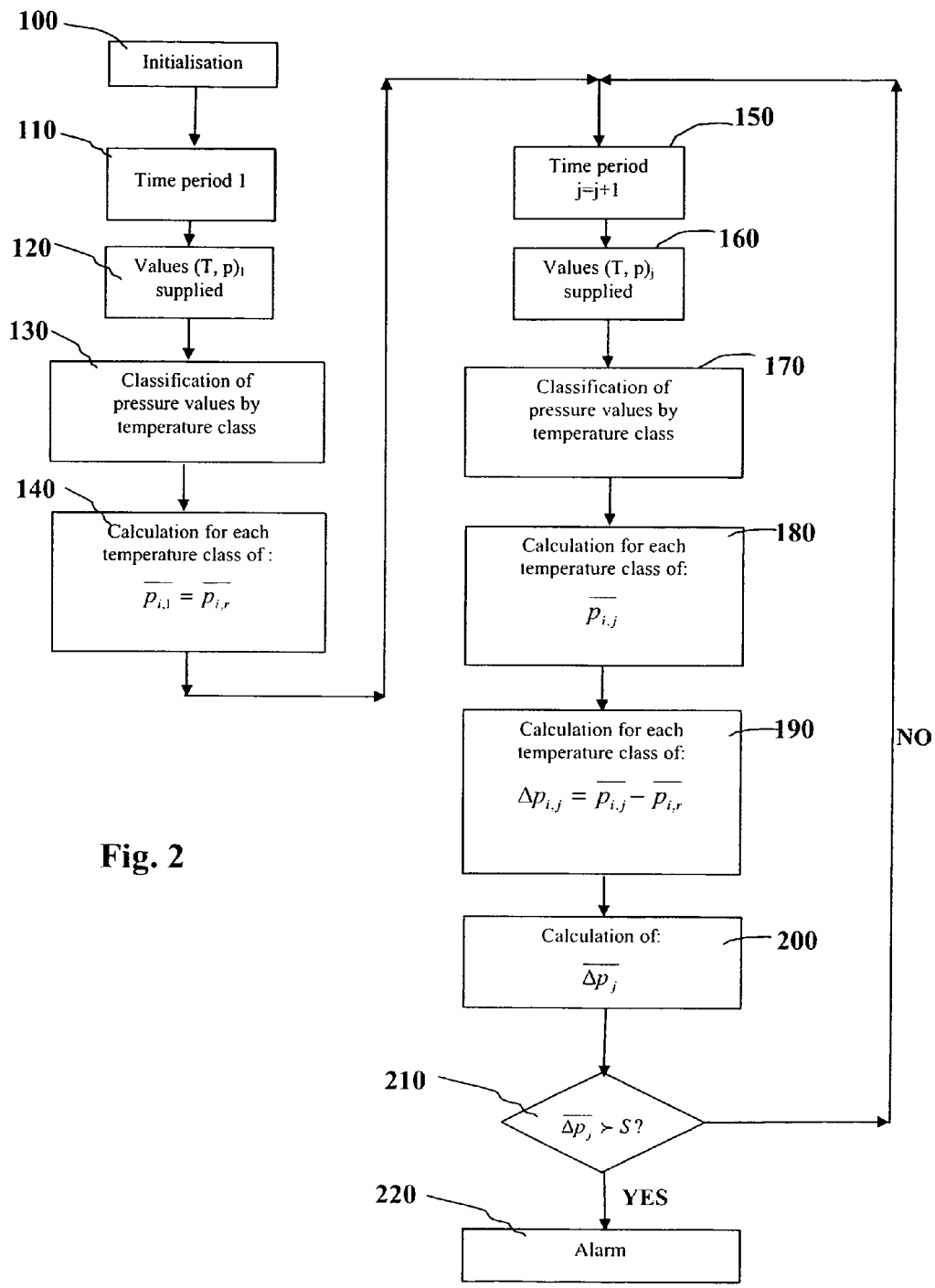
FIG. 2 is a simplified flow diagram of a method according to an embodiment of the invention.

FIG. 2 presents a simplified flow diagram of the method for processing the data sent periodically by the electronic modules 10 to the device 20. The data transmitted comprise in particular the pressure and temperature values, the time at which the measurements were made and a code identifying the sending electronic module.

Step 100 is an initialisation step. At step 110, a first period of time is considered, referred to as period 1. This period 1 can be chosen as the reference period.

At step 120, the computer identifies all the pressure and temperature values received by the device 20 during this first period of time 1.

Then the computer 22 classifies all the pressure values received by class of temperature (step 130) and calculates, for each class of temperature $[T_i]$, the mean value of the corresponding pressures $\overline{p_{i,1}}$ and stores, in the storage unit 23, these mean pressure values chosen as reference mean pressures: $\overline{p_{i,1}} = \overline{p_{i,r}}$ (step 140).

At step 150, any following period of time j is considered.

At step 160 the computer 22 considers all the pressure and temperature values received corresponding to this period of time j and classifies the pressure values by temperature class $[T_i]$ (step 170). Then, as before, it calculates, for each temperature class, the mean value of the pressures values received $\overline{p_{i,j}}$ (step 180) and puts them in memory in the storage unit 23.

The computer then calculates, at step 190, the difference between these mean pressures $\overline{p_{i,j}}$ corresponding to the period of time j and the reference mean pressures $\overline{p_{i,r}}$ corresponding to the mean pressures obtained during the period of time 1 chosen as the reference period, that is to say: $\Delta p_{i,j} = \overline{p_{i,j}} - \overline{p_{i,r}}$.

At step 200, the computer calculates the mean value of the differences between the mean pressures and the reference mean pressures: $\overline{\Delta p_j}$.

At step 210, the computer compares the mean value of the differences $\overline{\Delta p_j}$ with a given threshold S. This threshold is around 3% to 10% of the recommended inflation pressure. And, if the result of the comparison is positive, the computer triggers an alarm.

If the result is negative, the computer considers the following period of time at step 150.

Figure 3:
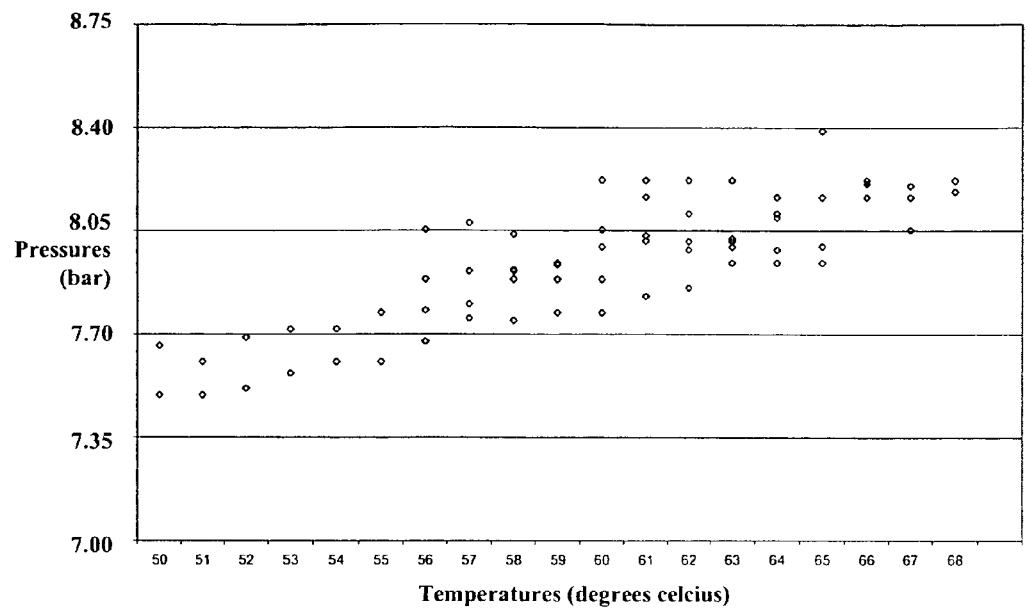
FIG. 3 presents the pressure and temperature values supplied during several successive periods of time (after a first analysis)

A construction vehicle was equipped with a device for measuring and recording the pressures and temperatures of the internal cavity of one of its tires. FIG. 3 presents all the pairs of pressure and temperature values recorded by the above device during a period of six consecutive days after a first analysis.

Each dot corresponds to the mean value of the pressure measurements recorded for a given period of time and a given temperature range.

It will be noted that these measurements have a high amplitude in terms of both temperature and pressure.

Figure 4:
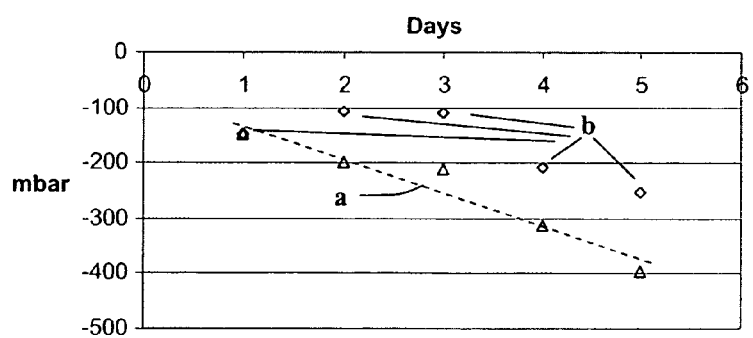
FIG. 4 presents the change in the mean values of the pressure differences for the successive periods of time corresponding to the data in FIG. 3.

FIG. 4 presents the result of the processing of the data in FIG. 3 according to the method according to the invention. It will be noted that, after five days, taking the first day of recording of the data as the reference period, a significant reduction of 400 mbar on average is identified and this reduction is indeed due to a leak in the tire. The reduction in inflation pressure is substantially linear (curve a).

This value of 400 mbar is around 5% of the recommended operating pressure of this tire under working conditions, that is to say 8 bar.

FIG. 4 also shows the results obtained (dots b) when the average of the pressure differences is considered without correcting them as indicated in the method according to the invention. A reduction in pressure is indeed detected but much more scattered and of lower amplitude.

The method according to invention also makes it possible to reliably detect very low leaks, of a much lower order of magnitude than the amplitudes observed in operation of the inflation pressures of a tire. This method is particularly useful in the case of very large tires, such as construction tires.

The invention is not limited to the examples described and depicted and various modifications can be made thereto without departing from its scope defined by the accompanying claims.

The invention claimed is:

1. A method of processing data from a vehicle tire monitoring system, the system regularly supplying for at least one tire values of the pressure and temperature of the fluid in the internal cavity of the said tire, in which, for a given tire:

for a first given period of time, referred to as the reference period:
- a device divides up, by class of temperature $[T]_i$, all the tire pressure and temperature values of the tire supplied during the reference period; and
- for each class of temperature $[T]_i$, said device calculates the mean pressure $\overline{(p_{i,r})}$ of the corresponding pressure values:

for at least a second given period of time, referred to as period j:
- said device divides up by class of temperature $[T]_i$ all the tire pressure and temperature values supplied during the period of time j;
- for each class of temperature, said device calculates the mean pressure $\overline{(p_{i,j})}$ of the corresponding pressure values;
- for each class of temperature, said device calculates the difference between the mean pressure and the reference mean pressure $(\Delta p_{i,j} = \overline{p_{i,j}} - \overline{p_{i,r}})$; and
- said device calculates the mean value of the differences between the mean pressures and the mean reference pressures $\overline{\Delta p_j}$.

2. The method according to claim 1, in which, if a given temperature class $[T]_i$ is empty for the rest of this period while the class $[T]_i$ is not empty for the periods j and k, for the period k, subsequent to said period j, wherein said device:
- calculates the mean pressure $\overline{(p_{i,k})}$ of the pressure values of the class $[T]_i$ and of the period k;
- calculates the difference between the mean pressure and the mean pressure of the class $[T]_i$ of the period j $(\Delta p_{i,k} = \overline{p_{i,k}} - \overline{p_{i,j}})$;
- corrects the mean pressure difference of the temperature class $[T]_i$ by adding the mean value of the differences between the mean pressures and the reference mean pressures $\overline{\Delta p_j}$ obtained for the period j, that is to say $\Delta p_{i,k}^c = \overline{p_{i,k}} - \overline{p_{i,j}} + \overline{\Delta p_j}$; and
- said device calculates the mean value of the differences and corrected differences between the mean pressures and the reference mean pressures $\overline{\Delta p_k}$.

3. The method according to claim 1, in which said device calculates the mean value of the pressure differences $\overline{\Delta p_j}$ for n successive periods of time, taking the oldest period of time as the reference period, and triggers an alarm when the change over time in the mean values of the pressure differences satisfies a given relationship.

4. The method according to claim 3, in which said device triggers an alarm when the variation over time of the mean values of the pressure differences exceeds, in absolute value, a given threshold S.

5. The method according to claim 4, in which the threshold S is between 3% and 10% of the nominal pressure value.

6. The method according to claim 3, in which said device calculates several series of mean values of pressure differences for periods of time of different durations in order to cover all the usual deflation ranges of the vehicle tires.

7. The method according to claim 6, in which the duration of the periods of time covers around one hour to several days.

8. The method according to claim 1, in which said device, for a given period of time, takes into account the temperature and pressure values supplied by the system between the maximum temperature supplied and a given lower temperature.

9. The method according to claim 8, in which the lower temperature is equal to the maximum temperature reduced by 20° C.

10. The method according to claim 1, in which, for each period of time, the device performs a statistical analysis of the temperature and pressure data supplied and takes the period of time into account only if the scatter in the measurements is below a given threshold.

11. The method of according to claim 10, in which the statistical analysis is a linear regression.

12. The method according to claim 11, in which the period of time is not taken into account when the regression coefficient of the data is less than 0.7.

13. The method according to claim 1, in which, the vehicle being a construction vehicle, the period of time comprises one day.

14. A device for implementing the method according to claims 1, comprising:
- a at least one access to the data to be processed;
- at least one calculation unit, permitting classifications and calculations; and
- instructions for use, enabling the method to be executed.

15. The device according to claim 14, as able to cooperate with a means of presenting the results.

16. A computer system comprising a device according to claim 1.

17. Software comprising code elements programmed for implementing the method according to claim 1, wherein the software is loaded into a computer system and executed by the computer system.

18. Software in the form of a product recorded on a medium that can be read by a computer system, comprising code elements programmed according to claim 17.

* * * * *